Feb. 24, 1942.  N. M. ADAMS  2,273,810
PRESERVED CASING AND METHOD OF PREPARING THE SAME
Filed April 27, 1939   2 Sheets-Sheet 1
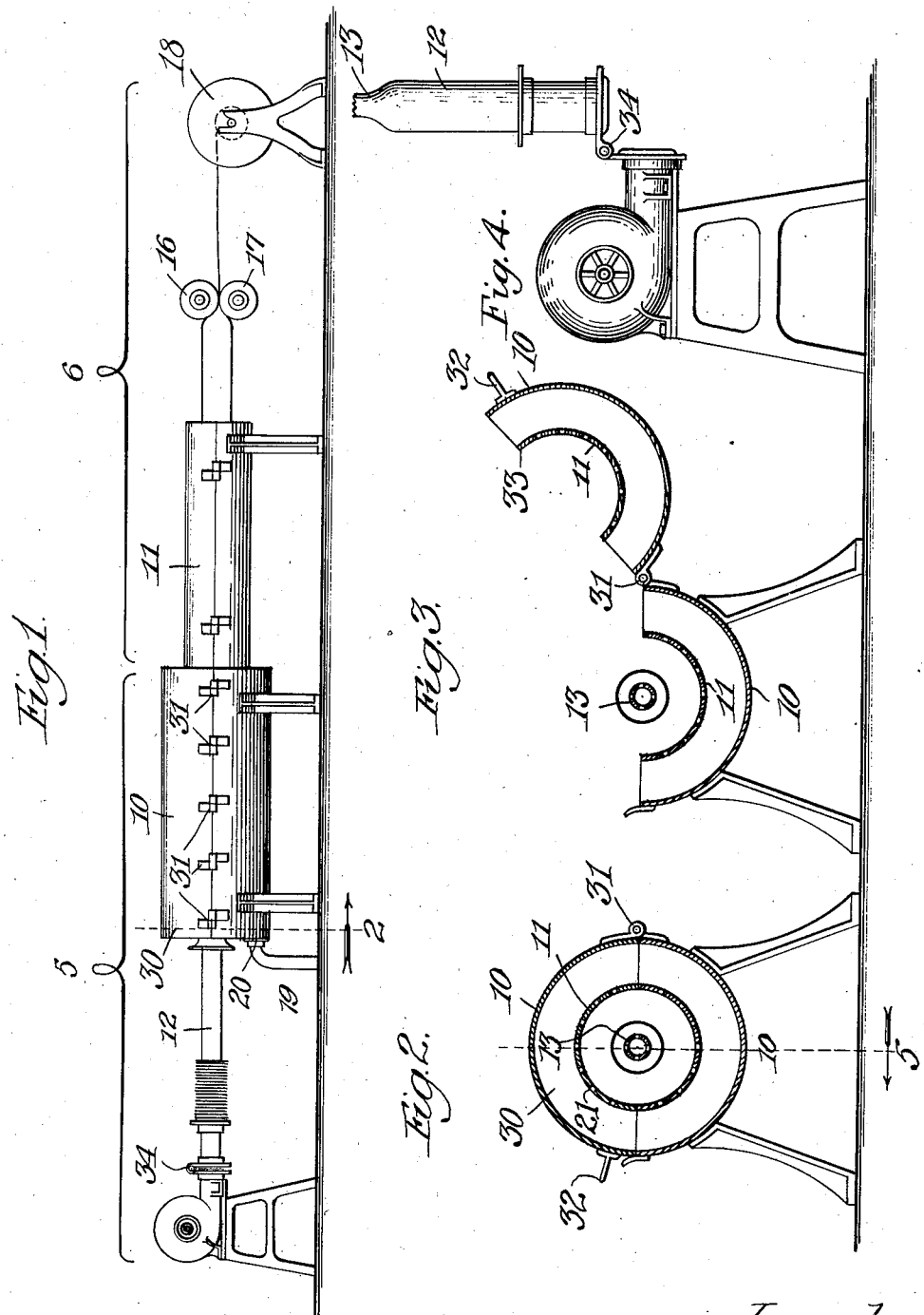
Inventor:
Nicholas M. Adams,
By Chritton, Wiles, Davis, Hirschl & Dawson,
Attys.

Feb. 24, 1942.   N. M. ADAMS   2,273,810
PRESERVED CASING AND METHOD OF PREPARING THE SAME
Filed April 27, 1939   2 Sheets-Sheet 2
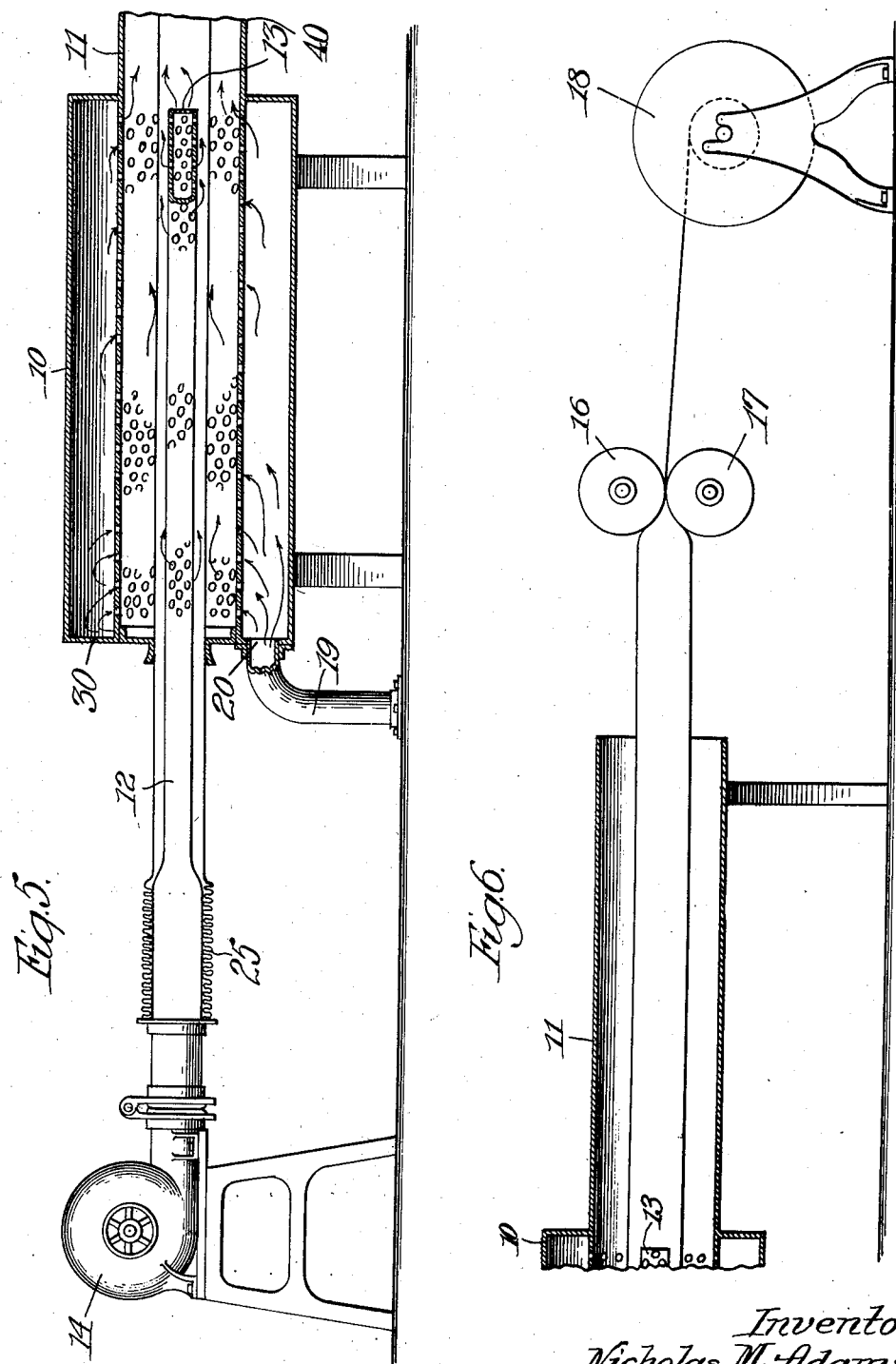
Inventor:
Nicholas M. Adams,
By Chritton, Wiles, Davies, Hirschl & Dawson,
Attys.

Patented Feb. 24, 1942

2,273,810

UNITED STATES PATENT OFFICE 2,273,810

PRESERVED CASING AND METHOD OF PREPARING THE SAME

Nicholas M. Adams, Chicago, Ill., assignor to Wilson & Company, Inc., a corporation of Delaware Application April 27, 1939, Serial No. 270,470

7 Claims. (Cl. 99—175)

This invention relates to a preserved animal casing and a method of preparing the same, and is a continuation-in-part of application Serial No. 243,467, filed December 1, 1938.

Animal intestines, commonly called casings, have heretofore been prepared by cleaning them and then packing them in a large amount of salt, and keeping them under refrigeration. Salted casings so prepared generally will not spoil, but the bacterial count thereon is very high, generally running about three million per gram. Moreover, salt burns take place in the casings, in some instances causing holes or weakened spots in the casing, depending upon the severity of the salt burn. The greatest disadvantage with salted casings is the large amount of salt required and the resultant great expense of transportation. An ordinary tierce will weigh about 600 pounds, of which only about 60 pounds will be represented by the casings themselves upon a dry basis, the rest being salt and moisture.

In the prior art practice, and particularly sheep, hog and goat casings, the casings are pulled from the animal, stripped in water, cleaned on special machines immediately; the casings are then taken and graded as to size and quality, after which they are salted, drained, and then packed with salt, either with or without previous curing in a pickle solution. The salted casings are then placed in wooden tierces, as already described.

In accordance with the present invention, the necessity of salting and refrigeration is entirely done away with. In place of the salt, the casings are air-dried to a predetermined moisture content, and are then packed, preferably in the absence of air.

A very simple and quickly applied natural test for a suitable moisture content has been discovered, namely, that when the casings are dry enough so that their folds do not stick together upon contact, they are dry enough to keep.

An apparatus for carrying out the invention is diagrammatically illustrated in the drawings, in which:

Fig. 1 shows a side elevation, partly in section and partly broken away, of a drying device with a casing being treated in it; Fig. 2 is an end view thereof in closed position; Fig. 3 is a similar view in open position; Fig. 4 is a side elevation, broken away, showing the mandrel in raised position; and Figs. 5 and 6 are detailed side elevations partly in section, together showing the structure of Figure 1.

The apparatus comprises a drying chamber 10 provided with a central tube 11, which extends beyond the chamber proper and which is open at the front end. It is closed by a rubber plate 30 at the back end.

An elongated mandrel 12 is positioned within the jacket 11 and extends well into the drying chamber. It is provided with a large number of small holes 13, particularly at its end which is within the chamber. A blower fan 14 is connected to the tube. Associated with the outlet from the tube 11 are a pair of rollers 16 and 17 adapted to advance the dried casings to suitable reels 18. A warm air supply line 19 enters the chamber 10 at 20 and supplies air thereto. The jacket 11 is provided with openings 21 through which the warm air enters the jacket and contacts the outer portions of the casing.

As shown in Figs. 2 and 3, the chamber is hinged at 31, and the jacket or tube 11 is divided in two, so that the upper half of the chamber may be swung upwardly and backwardly by the handle 32. The rubber back plate 30 is cut away at 33 to accommodate the sausage casing.

In operation, the mandrel 12 is tipped upwardly on the hinge 4, and a sausage casing 25 is gathered about the end portion of the mandrel as shown in Fig. 1. A string is tied to the front end of the casing, and it is drawn through the drying chamber and the string passed through the roll and onto the reel. The chamber is then closed, the blower started, and the hot air fan also started to introduce hot air thereto.

Only very little air passes through the blower fan 14, the purpose of this being to free the casing from the mandrel and to keep it inflated. Hog and sheep casings, which are the ones primarily treated upon this apparatus, are so porous that they will not remain inflated for a very long period without the addition of a fresh supply of air.

The amount of air supplied to the line 19 is preferably about 15 cubic feet per minute of air at 140° F., and 15% to 25% relative humidity. When the air is supplied at this rate, the casings are advanced at the rate of about 2½ feet per minute. The temperature of the casing, however, never quite reaches the temperature of the air.

The extension 40 of the tube 11 provides a chimney-effect wherein the air which, by that time, has absorbed a good deal of moisture and is relatively saturated, acts to bring the outer and inner portions of the casing into more or less equilibrium as to moisture content, and provides a better finished casing.

The drying temperature, however, is not critical. It can be varied between 70° and 160° F., and the relative humidity may vary from, say, 5% to 40%. Likewise, the air velocity may vary from 5 to 30 cubic feet per minute, or within wider ranges if other conditions are controlled.

For hog, sheep and goat gut, a mandrel about a foot long and having ⅜ inch external diameter is suitable. The jacket 11 is about 1½ inches in diameter, and is 8 or 9 inches long within the chamber, and extends about 8 inches beyond it. The chamber itself is approximately 3 inches by 8.

After the entire casing has been run onto the reel, the casing is packed in the absence of air without salt. Preferably this is done in a substantial vacuum, say 22–29 inches of mercury. However, inert gases such as nitrogen may be used in the place of vacuum.

If the dried casings are left in air for a prolonged period, the protein material gradually loses its ability to soak or "plump" freely in water without the addition of alkali or acids. The vacuum packed or inert gas packed material does not act in this manner. Even after many months it may be handled like fresh material.

It is thus possible to eliminate the large amounts of salt heretofore required, and also to save nine-tenths of the freight and a great deal of expense for salt, tierces, and the costs of refrigeration. At the same time, the casings themselves are actually better than before and are more sanitary from a bacteriological standpoint, the bacterial count on a casing prepared according to this invention being only about 1/350 of that of a salted casing.

The casings may be subdivided longitudinally or transversely and employed in sausage making, surgical sutures, tennis or other strings, or any other casing use.

It has further been discovered that the finished casing may be improved particularly from the standpoint of its ability to resoften rapidly, by incorporating with the casing before drying, an edible alkaline buffering material having a pH greater than that of the casing.

It has heretofore been suggested that glycerine be added to casings, particularly artificial casings, prior to drying, but such a material not only markedly weakens the gut (about 25%) but makes its resoftening more difficult by shrinking the walls during the stuffing operation.

The use of an edible alkaline buffering material, preferably a salt of a strong metal and a weaker acid such as sodium bicarbonate, sodium carbonate, trisodium phosphate, disodium phosphate, calcium lactate, calcium citrate, sodium lactate, or other similar materials, will greatly increase the speed with which the casing will recombine with water, without decreasing its tensile strength. The improved moisture absorption increases the slippage of the material on the stuffing horn.

As an example of such procedure, freshly cleaned and graded sheep and hog casings were treated in a solution of sodium bicarbonate in the proportion of one pound of wet gut material and 1½ litres of 0.75% sodium bicarbonate solution. The gut was kept in such solution at least 3 to 4 hours at ordinary room temperatures. Thereafter the gut was passed through the drying machine as heretofore described.

The pH of ordinary gut material is around 6.9. The modified gut produced by the foregoing example has a pH of around 7.4. It is preferred not to raise the pH of the gut above 8. Ordinarily, the amount of buffering material left in the casing is extremely small. In the example given, the amount retained was approximately 0.2% (on the weight of ash on ignition) and it is not preferred to introduce over 2% to the casing.

The amount described markedly increases the hydrophilic character of the gut without decreasing its tensile strength.

What I claim as new, and desire to secure by Letters Patent, is:

1. The method of preserving a fresh animal casing, which comprises preliminarily treating it with an alkaline buffering material, drying the casing and storing the dried casing in the absence of preservative materials whereby the buffering agent improves the hydrophilic character of the gut.

2. A sausage casing, comprising a dried porous natural animal casing, gas-dried, pliable, salt-free, non-sticking water absorptive, substantially free from bacteria, and containing a small amount of an alkaline buffering material.

3. A casing as set forth in claim 2, in which the amount of alkaline buffering material is sufficient to render the casing substantially more hydrophilic without substantially decreasing its tensile strength.

4. A sausage casing, comprising a dried porous natural animal casing, gas-dried, pliable, salt-free, non-sticking water absorptive, and containing a small amount of an alkaline salt.

5. A casing as set forth in claim 4, in which the salt is sodium bicarbonate.

6. A casing as set forth in claim 4, in which the amount of alkali is from 0.1 to 2%.

7. A porous natural animal casing, pliable, free from salt, non-sticking, containing a small percentage of an alkaline buffering material, and having a pH of approximately 7.4, the casing having a freedom from bacteria at least as great as casings salted in the customary salting procedure.

NICHOLAS M. ADAMS.